United States Patent [19]

Providenza et al.

[11] Patent Number: 4,849,924
[45] Date of Patent: Jul. 18, 1989

[54] EVENT COUNTING PRESCALER

[75] Inventors: John R. Providenza; Bruce Ableidinger, both of Beaverton, Oreg.

[73] Assignee: Tektronix, Inc., Beaverton, Oreg.

[21] Appl. No.: 744,581

[22] Filed: Jun. 13, 1985

[51] Int. Cl.⁴ .............................................. G06F 7/50
[52] U.S. Cl. .................................................. 364/770
[58] Field of Search ........ 364/768, 770, 200 MS File, 364/900 MS File; 371/5, 69

[56] References Cited

U.S. PATENT DOCUMENTS

| | | | |
|---|---|---|---|
| 3,505,511 | 4/1970 | Campano et al. | 364/770 |
| 3,538,318 | 11/1970 | Clutterbuck et al. | 364/770 |
| 3,564,227 | 2/1971 | Bowers | 364/770 |
| 3,771,144 | 11/1973 | Belady et al. | 364/200 |
| 4,016,545 | 4/1977 | Lipovski | 364/900 |
| 4,092,819 | 6/1978 | Takase | 364/770 |
| 4,445,414 | 5/1981 | Smith | 364/770 |

*Primary Examiner*—Gary V. Harkcom
*Assistant Examiner*—Long Thanes Nguyen
*Attorney, Agent, or Firm*—Allston L. Jones; Robert S. Hulse

[57] ABSTRACT

An apparatus for counting occurrences of a plurality of events characterized by unique event numbers includes a random access memory for storing event count numbers at addresses corresponding to the event numbers. The memory is addressed by an event number as the associated event occurs, and the event count number stored at such address is read and latched to an input of an adder. The adder increments the latched event count number and the incremented event count number is then written back into the memory at the current event number address. A buffer is provided to store the current event number whenever the adder overflows as a result of a count. Several such event numbers may be stored in the buffer for subsequent retrieval by an external controller thereby permitting the controller to determine when an event has been counted a fixed number of times and to increment its own internally stored count at a slower rate than the rate at which data is applied to the prescaler.

10 Claims, 1 Drawing Sheet

EVENT COUNTING PRESCALER

BACKGROUND OF THE INVENTION

The present invention relates to event counters and in particular to a method and apparatus for prescaling an event count.

In testing microprocessor code it is often useful to count the number of times various memory storage locations or memory mapped I/O ports are accessed. Such data can be used as a measure of the efficiency of the code in accomplishing a task. In the prior art, the code under test was modified to include subroutines which updated a stored count each time a selected memory address was generated. This intrusive approach is difficult to utilize because it requires an intimate knowledge of the code being tested in order to modify it. Another approach is to connect a word recognizer to the address bus of the microprocessor and to program the word recognizer to generate a pulse each time a selected address appears on the bus. The pulses are then counted by a conventional counter. This method is nonintrusive since the code under test is not modified, and is therefore often easier to perform and less prone to error. However to count memory access operations for a large number of different addresses, this method requires a large number of word recognizers and counters. The address bus of a computer under test could also be applied as a data input to a test computer which could be programmed to count occurrences of selected addresses, eliminating the need for large numbers of counters and word recognizers, but such a method would require the use of a very high speed, costly test computer.

It would therefore be useful to provide a method and apparatus which could count occurrences of a large number of different events characterized by unique numbers appearing on a bus, and then supply a continuous prescaled count to an external computer or controller.

SUMMARY OF THE INVENTION

According to a first aspect of the invention, an apparatus for counting and prescaling events characterized by unique numbers appearing on a bus comprises a random access memory (RAM), a latch and an adder. The bus is applied to address the RAM according to the event number appearing thereon. When a number characterizing an event appears on the bus, the RAM places on a data output bus to the latch count data stored at the current address. The latch then transmits this count data to the adder which increments the count data by one and then places the incremented count data on a data input bus to the RAM. The incremented count data is written into the RAM at the current event number address. Thus each time an event number appears on the bus, the count data stored in the RAM at an address matching the event number is incremented by one. Therefore each storage address in the RAM contains a count of the number of times the corresponding event number has appeared on the bus since the data stored in the RAM was initialized to zero.

A buffer is provided to store the current event number whenever the adder overflows (its output returns to zero) as a result of a count. Several such event numbers may be stored in the buffer for subsequent retrieval by an external controller at a rate that is lower than the data input rate to the prescaler and at idle moments when the controller is not performing other tasks. Each time the controller retrieves an event number from the buffer, the controller can ascertain the event has been counted a fixed number of times and can increment an internally stored count in its own memory which may be denser and slower but cheaper than the RAM of the prescaler.

According to a second aspect of the invention, a first multiplexer is provided to switch the address input to the RAM from the event number bus to another bus carrying an address from the external controller. The controller also has access to the RAM data output bus and controls the switching operation of the multiplexer. By switching the multiplexer the external controller can address the RAM so that it may read the current event count stored at any RAM address.

According to a third aspect of the invention, a second multiplexer controlled by the external controller is provided to switch the data input to the adder from the latch output to a minus one. The external controller can then reset to zero the count stored at any RAM address by applying the minus one to the adder which then places a zero on the data input terminals of the RAM. The zero is then written into the RAM at an address determined by the controller, thereby resetting the count.

It is accordingly an object of the present invention to provide a new and improved apparatus for providing continuous prescaled counts of events characterized by unique event numbers.

It is another object of the invention to provide an event counter capable of generating simultaneous prescaled counts of a plurality of different events.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DRAWINGS

FIG. 1 is a block diagram of an event counter according to the present invention; and FIG. 2 is a block diagram of an embodiment of the sequencer of FIG. 1.

DETAILED DESCRIPTION

Figures 1, 2:
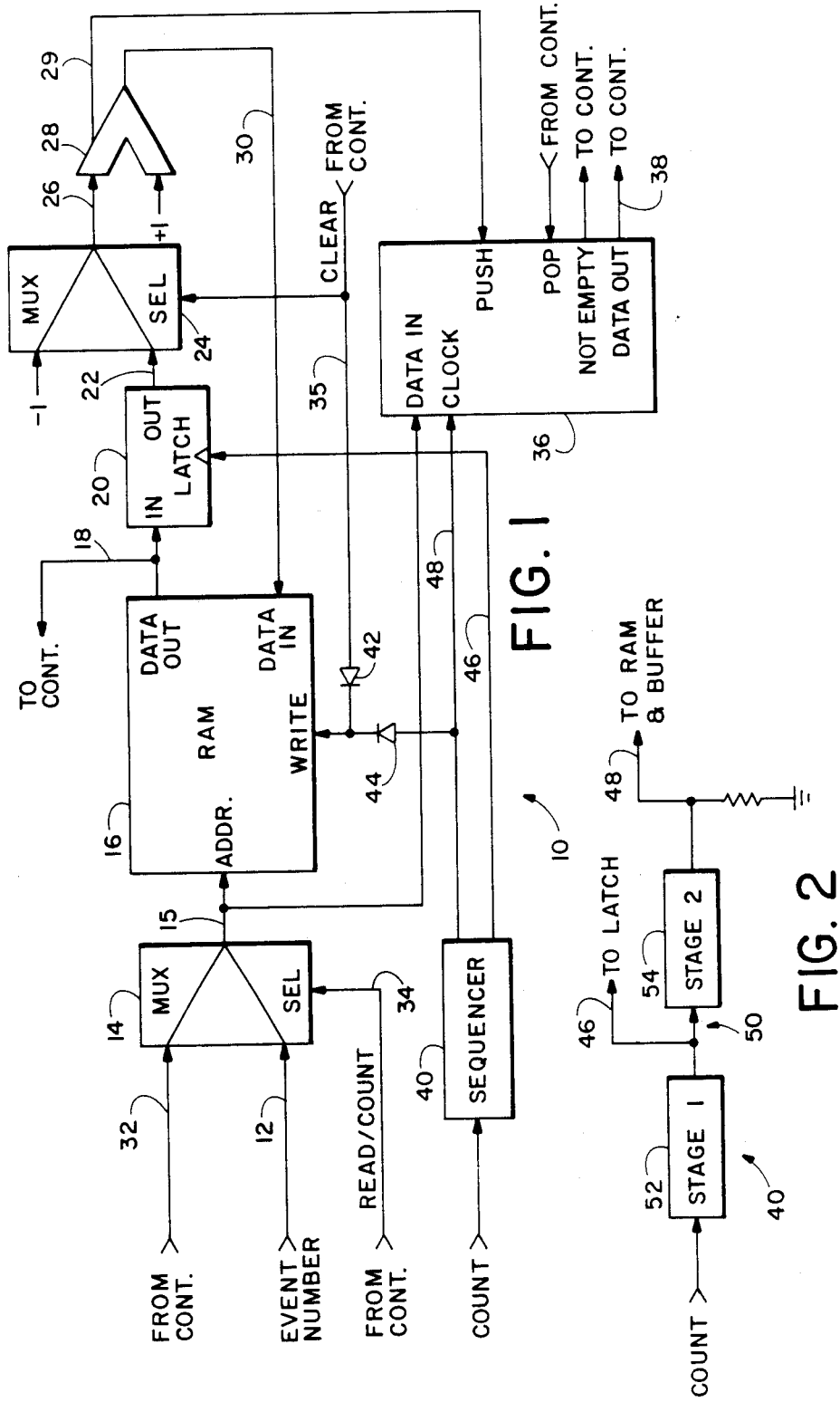

Referring to FIG. 1, there is depicted in block diagram form an event counter 10 according to the present invention, adapted to count occurrences of events characterized by unique binary event numbers, such as addresses appearing on a bus. An event number, carried on bus 12, is applied to one input of a first multiplexer 14. The output terminals of multiplexer 14 are connected by a bus 15 to address terminals of a random access memory (RAM) 16. The RAM 16 stores a separate event count for each event at an address corresponding to the event number. When RAM 16 is addressed during a read operation, the event count data stored at the current address appears on data output bus 18 connected to a data input of a latch 20. When a clock input of latch 20 is strobed with a pulse, the data at its input appears on a latch output data bus 22 applied to one input of a second multiplexer 24. The output of second multiplexer 24 is carried on a data bus 26 to one input of an adder 28 and a binary one is applied to another input of adder 28 which therefore sums the input from multiplexer 24 with the binary one and places the result on data bus 30. The result is applied to a set of data input terminals of RAM 16.

During a counting operation, multiplexer 14 is switched to a state wherein an event number appearing on bus 12 is applied to address RAM 16, which is normally in a read mode unless a WRITE control input is asserted. This WRITE control input is initially not asserted, so an event count data stored at an address matching the event number on bus 12 is initially placed on data output bus 18. The clock input of latch 20 is then strobed whereby the event count data is passed through latch 20 and over output bus 22 to multiplexer 24. Multiplexer 24 is normally switched such that the event count data on bus 22 passes through the multiplexer and over bus 26 to adder 28 where it is incremented by one and further passed over the data input bus 30 to the RAM 16 data input. The WRITE control input of the RAM 16 is then strobed whereby the incremented event count data appearing on bus 30 is written into RAM 16 at the current event number address, replacing the existing event count.

Thus each time an event number appears on input bus 12, the data stored at a RAM 16 address determined by the event number is incremented by one. Therefore this stored data represents the current event count for the event associated with that event number. The number of different event numbers which can be counted is limited only by the number of RAM 16 storage locations, and the maximum count for each event is limited only by the number of data bits which can be stored at each storage location.

The count data stored at any address in the RAM 16 may be read by an external controller. A bus 32 from the external controller is applied to another input of first multiplexer 14 while a read/count control line 34 from the controller, applied to a SELECT input of the multiplexer 14, controls the switching state of the multiplexer. When the controller wishes to read the data the read/count control line is asserted, and multiplexer 14 applies addressing data carried on bus 32 from the controller to address RAM 16. The data stored in RAM 16 then appears on data output bus 18 which carries the data to the external controller. In this operation, however, the WRITE control input to the RAM 16 is not asserted and any data appearing on RAM data input bus 30 is not written into the RAM.

The external controller may initialize (zero) the count data stored at any address in the RAM 16. To do so, the address of the data to be initialized is placed on bus 32 and a READ/COUNT control input on line 34 applied to the SELECT input of the first multiplexer 14 is asserted whereby the multiplexer passes the address on to the address input of RAM 16. A CLEAR control line 35 from the external controller controls the switching position of the second multiplexer 24, and also asserts the WRITE control input of RAM 16 through a diode 42. A minus one (−1) is applied to a second input of multiplexer 24 so that when the CLEAR line is asserted, multiplexer 24 transmits the minus one to the ADDER 28 over bus 26 rather than the current RAM 16 data output. The adder 28 then sums the minus one input with the plus one input to produce a zero output on the RAM 16 data input bus 30 and this zero value is then written into RAM 16 at the current event number address to initialize the count for the associated event number as the CLEAR line 35 is deasserted.

A buffer 36, which may be of the last-in, first-out or first-in, first-out type, is provided to store event numbers when the adder 28 overflows, i.e. when as a result of a count the adder output changes from a maximum number to a zero. Adder 28 asserts an overflow output line 29 whenever this happens and this overflow output line 29 is applied to a PUSH input of buffer 36. RAM 16 data input bus 15, carrying the event number, is also connected to a DATA IN input of buffer 36. When the PUSH input is asserted by the overflow line 29 output of adder 28, the current event number on bus 15 is stored in buffer 36 on receipt of a pulse on a CLOCK input to buffer 36. A single-bit, NOT EMPTY output signal of buffer 36 is asserted and transmitted to the controller whenever the buffer contains one or more event numbers. The external controller may then read an event number stored in buffer 36 by asserting a POP input thereto and the data then appears on a buffer data output bus 38 connected to the controller.

Buffer 36 permits event counter 10 to count continuously, acting as a count prescaler for the external controller. Each time adder 28 reaches its limit for a particular event number count, the count in RAM 16 resets to zero and the event number is stored in buffer 36 until read by the controller. When the controller reads such a number, it knows that the event has been counted a fixed number of times. When the counting process ends, the controller can read the remaining count stored in RAM 16 to update the final count result for any event number and can then reset the count.

A count sequencing circuit 40 provides the necessary timing for the clocking of the latch 20 and the buffer 36 and for the assertion of the WRITE control input of RAM 16 during a count operation. One output line 46 of sequencer 40 is applied to the clock input of latch 20, while a second output line 48 is applied to the clock input of buffer 36 and through a diode 44 to the write control input of RAM 16. Diodes 42 and 44 are provided to isolate the CLEAR control line from the sequencer 40 write control output.

A COUNT pulse from a device under test is applied to an input of sequencer 40 when an event number appearing on bus 12 is valid and the event is ready to be counted. By way of example, such a signal is typically available on a read/write control line of a microprocessor when the event numbers to be counted comprise addresses appearing on the microprocessor address bus. After the COUNT pulse input is applied, the sequencer 40 waits for a time sufficient for the RAM 16 to place the count data on output bus 18 to latch 20, and then asserts output line 46, causing latch 20 to pass the count data to adder 28. After another delay sufficient to allow adder 28 to transmit the incremented data to RAM 16, the sequencer 40 transmits a pulse on output line 48 causing RAM 16 to write the new data to the current address. At the same time, the pulse on line 48 is applied to the clock input of buffer 36 so that if the adder 28 happens to overflow as a result of the count and generates a PUSH signal, the current event number on bus 15 is stored in the buffer 36.

An embodiment of the count sequencing circuit 40, depicted in block diagram form in FIG. 2, comprises a two stage delay line 50. The COUNT pulse is applied to one end of the delay line. Output line 46 is tapped from the delay line after the first stage 52, and output line 48 is tapped after the second stage 54. The first stage is sized to delay the COUNT pulse for at least as long as the RAM access time, while the second stage is sized to delay the COUNT pulse for at least as long as the adder 28 operating time.

Thus it is seen that the present invention is capable of maintaining simultaneous counts of a plurality of events characterized by unique event numbers and is also capable of continuous operation as an event count prescaler for an external controller. While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for non-intrusively counting the number of times at least one selected event code appears on a bus of a central processing unit, the apparatus comprising:

storage means having an address port, a data out port and a data in port, said storage means of storing an event count corresponding to each of said at least one selected event code with each of said at least one selected event code corresponding to a different address of the storage means;

a first address bus for carrying an address which is generated independently of any event code;

a second address bus for carrying event codes;

a third address bus coupled to the address port of the storage means, said third address bus for addressing said storage means;

multiplexer means for selectively connecting either said first or second address busses to said third address bus; and incrementing means coupled to receive the stored event count from the data out port of the storage means for incrementing the stored event count for each of said at least one selected event code when each event occurs and coupling that incremented event count to the data in port of the storage means for storage as the new event count.

2. An apparatus as in claim 1 wherein said storage means comprises a random access memory.

3. An apparatus as in claim 1 wherein said incrementing means comprises an adder having one input port for receiving the stored event count from the storage means and having another input port for receiving a fixed increment number, said adder generates an incremented event count as the sum of the stored event count and the fixed increment number.

4. An apparatus as in claim 1 further comprising a buffer coupled to said incrementing means and to the address port of said storage means for storing said at least one selected event code whenever said incrementing means asserts an overflow signal.

5. An apparatus for non-intrusively counting the number of times at least one selected event code appears on a bus of a central processing unit, the apparatus comprising:

random access memory means for storing an event count at an address determined by the event code, said memory means being addressed by said event code when said event occurs, said memory means thereupon outputting said event count;

a first address bus for carrying an address which is generated independently of any event code;

a second address bus for carrying event codes;

a third address bus coupled to an address port of the memory means, said third address bus for addressing said memory means;

multiplexer means for selectively connecting either said first or second address busses to said third address bus;

latch means coupled to receive said outputted event count from the memory means for latching said outputted event count on assertion of a latch clock pulse, said latch clock pulse being asserted after said event count is outputted by said memory means;

adder means, having one input port for receiving the latched event count from the latch means and having another input port for receiving a fixed increment number, said adder means generates an incremented event count as the sum of the latched event count and the fixed increment number; and writing means for writing said incremented event count from the adder means back into said memory means at the memory address corresponding to the counted event code.

6. An apparatus for non-intrusively counting the occurrences of a plurality of selected event codes on a bus of a central processing unit, each event code being unique, the apparatus comprising:

random access memory means having an address port, an input port and an output port, said memory means stores event counts at addresses determined by the event codes;

address means coupled to the address port of the memory means for selectively addressing said memory means by one of said event codes when a corresponding one of said plurality of event codes occurs, said memory means subsequently outputting said corresponding event count on its output port, said address means includes:

a first address bus for carrying an address which is generated independently of any event code;

a second address bus for carrying event codes;

a third address bus coupled to the address port of the memory means, said third address bus for addressing said memory means;

multiplexer means for selectively connecting either said first or second address busses to said third address bus; and incrementing means coupled to the output port of the memory means for incrementing the outputted event count subsequently, said incremented event count being written back into said input port of the memory means at the address corresponding to event code last outputted from said memory means.

7. An apparatus as in claim 6 wherein said incrementing means comprises an adder having one input port for receiving the outputted event count from the storage means and having another input port for receiving a fixed increment number, said adder generates said incremented event count as the sum of the stored event count and said fixed increment number.

8. An apparatus for non-intrusively counting the occurrences of a plurality of selected event codes on a bus of a central processing unit, each event code being unique, the apparatus comprising:

random access memory means having an address port and an output port, said memory means stores event counts at addresses corresponding to the event codes;

a first address bus for carrying an address which is generated independently of any event code;

a second address bus for carrying event codes;

a third address bus coupled to the address bus coupled to the address port of the memory means, said third address bus for addressing said memory means;

multiplexer means for selectively connecting either said first or second address busses to said third address bus;

an adder having one input port for receiving the outputted event count from the output port of the memory means and having another input port for receiving a fixed increment number, said adder generating said incremented event count as the sum of the outputted event count and the fixed increment number; and buffer means for storing event codes appearing on said second address bus when said adder asserts an overflow signal.

9. An apparatus for non-intrusively counting the occurrences of a plurality of selected event codes on a bus of a central processing unit, each event code being unique, the apparatus comprising:

random access memory means having an address port, an input port and an output port, said memory means stores event counts at addresses determined by the event codes;

address means coupled to the address port of the memory means for selectively addressing said memory means by one of said event codes when a corresponding one of said plurality of event codes occurs, said memory means subsequently outputting said corresponding event count on its output port;

incrementing means coupled to the output port of the memory means for incrementing the outputted event count, subsequently, said incremented event count being written back into said input port of the memory means at the address corresponding to event code last outputted from said memory means; and a buffer coupled to said incrementing means and to the address port of said random access memory means for storing said event codes whenever said incrementing means asserts an overflow signal.

10. An apparatus as in claim 9 wherein said buffer may store a plurality of event codes.

* * * * *